United States Patent

Tamir et al.

[11] Patent Number: 6,122,013
[45] Date of Patent: Sep. 19, 2000

[54] CHROMAKEYING SYSTEM

[75] Inventors: Michael Tamir, Tel Aviv; Avi Sharir, Ramat Hasharon, both of Israel

[73] Assignee: Orad, Inc., Forest Hills, N.J.

[21] Appl. No.: 08/732,336

[22] PCT Filed: Apr. 25, 1995

[86] PCT No.: PCT/US95/05324

§ 371 Date: Dec. 30, 1996

§ 102(e) Date: Dec. 30, 1996

[87] PCT Pub. No.: WO95/30312

PCT Pub. Date: Nov. 9, 1995

[30] Foreign Application Priority Data

Apr. 29, 1994 [IL] Israel ........................................ 109487

[51] Int. Cl.[7] .................................................. H04N 9/75
[52] U.S. Cl. .......................... 348/587; 348/586; 348/590; 348/591; 348/592; 382/106
[58] Field of Search ..................... 348/586, 587, 348/592, 585, 590, 591; 382/106, 154, 162; H04N 9/75

[56] References Cited

U.S. PATENT DOCUMENTS

| | | | |
|---|---|---|---|
| 2,974,190 | 3/1961 | Geiger | 178/7.1 |
| 3,887,762 | 6/1975 | Uno et al. | 178/6 |
| 3,973,239 | 8/1976 | Kakumoto et al. | 340/146.3 |

(List continued on next page.)

FOREIGN PATENT DOCUMENTS

| | | | |
|---|---|---|---|
| 57-93788 | 10/1982 | Japan . | |
| 57093788 | 10/1982 | Japan | H04N 9/02 |
| WO 93/02524 | 2/1993 | WIPO . | |
| WO 93/06691 | 4/1993 | WIPO . | |
| WO 94/05118 | 3/1994 | WIPO . | |
| WO 95/30312 | 11/1995 | WIPO . | |
| WO 97/09823 | 3/1997 | WIPO . | |

OTHER PUBLICATIONS

Canny, J., "A Computational Approach to Edge Detection", *IEEE Trans. On PAMI, PAMI–8, No. 6,* 1986, 679–697.

Illingworth, J. And Kitler, J., "A Survey of the Hough Transform", *CVGIP, 44,* 1988, 87–116.

Serra J. Image Analysis and Mathamatical Morphology, Academic Press, London 1982.

Rosenfeld et al. Digital Picture Processing, Academic Press 1982 2:84–112.

Haseba et al. Real–Timing compositing system of a real camera image and a computer graphic image, International Broadcasting Convention Sep. 16–20, 1994 Conf. Publ. No.. 397, IEEE 1994 656–660.

Cafforio et al. The differential method for motion estimation, in: T.S. Huang eg., Image sequence processing and dynamic scene analysis Spring, Berlin, 1983 104–124.

(List continued on next page.)

*Primary Examiner*—John K. Peng
*Assistant Examiner*—Wesner Sajous
*Attorney, Agent, or Firm*—Woodcock Washburn Kurtz Mackiewicz & Norris LLP

[57] ABSTRACT

A chromokeying system includes a store that contains a representation of a known coded chromokeying pattern. The system further includes a frame grabber that grabs a video image including at least a portion of the known coded chromokeying pattern and a foreground subject. A perspective transformation computation unit computes a perspective transformation by comparing the video image of the portion of the coded chromokeying pattern with the known chromokeying pattern. The system may further include a background generation unit that receives a background image and applies the perspective transformation to the background image to produce a transformed background. The portion of the coded chromokeying pattern in the video image can then be replaced by the transformed background to create a composite image.

8 Claims, 6 Drawing Sheets

U.S. PATENT DOCUMENTS

| | | | |
|---|---|---|---|
| 4,000,399 | 12/1976 | Kawahara | 235/92 |
| 4,010,446 | 3/1977 | Kawa | 340/146.3 |
| 4,200,890 | 4/1980 | Inaba et al. | 358/183 |
| 4,393,394 | 7/1983 | McCoy | 358/22 |
| 4,394,680 | 7/1983 | Watanabe | 358/22 |
| 4,396,939 | 8/1983 | Kitahama | 358/22 |
| 4,409,611 | 10/1983 | Vlahos | 358/22 |
| 4,409,618 | 10/1983 | Inaba et al. | 358/183 |
| 4,488,169 | 12/1984 | Yamamoto | 358/22 |
| 4,533,937 | 8/1985 | Yamamoto et al. | 358/22 |
| 4,547,897 | 10/1985 | Peterson | 382/8 |
| 4,566,126 | 1/1986 | Miyagawa et al. | 382/48 |
| 4,621,280 | 11/1986 | Shinohara et al. | 358/22 |
| 4,628,363 | 12/1986 | Kashiwa et al. | 358/183 |
| 4,630,101 | 12/1986 | Inaba et al. | 358/22 |
| 4,947,240 | 8/1990 | Hausdorfer | 358/22 |
| 4,949,165 | 8/1990 | Riemann et al. | 358/10 |
| 4,979,021 | 12/1990 | Thomas | 358/22 |
| 5,264,933 | 11/1993 | Rosser et al. | 358/183 |
| 5,353,392 | 10/1994 | Luquet et al. | 395/135 |
| 5,488,675 | 1/1996 | Hanna | 382/284 |
| 5,491,517 | 2/1996 | Kreitman et al. | 348/581 |
| 5,502,482 | 3/1996 | Graham | 348/140 |
| 5,566,251 | 10/1996 | Hanna | 382/284 |
| 5,737,031 | 4/1998 | Tzidon | 348/587 |

OTHER PUBLICATIONS

Adiv G. Determining Three–Dimensional Motion and Structure from Optical Flow Generated by Several moving objects, IEEE trans. Pattern Analysis and Machine Intelligence 1985 7:384–401.

Sommerhauser F. Das virtuelle studio Grundlagen Einer Neuen Studioproduktionstechnik Fernseh–Und Kino–Technik 50 Jahrgang Nr. 1–2/1996.

Adiv, G., "Determining Three–Dimensional Motion and Structure from Optical Flow Generated by Several Moving Objects", *EEE trans. Pattern Analysis and Machine Intelligence,* 1985, 7, 384–401.

Cafforio et al., "The Differential Method for Motion Estimation", in: Image Sequence Processing and Dynamic Scene Analysis, T. S. Huang (ed.) Spring, Berlin, 1983 104–124.

Weng et al., "Calibration of Stereo Cameras Using a Non–Linear Distortion Model", *IEEE 10th. Intl. Conf. Pattern Recognition,* Jun. 16–21, 1990, 246–253.

Sommerhauser, F., "Das Virtuelle Studio Grundlagen Einer neuen Studioproduktionstechnik", Fernseh–Und Kino–Technik 50, Jahrgang Nr. 1–2/1996 (English language abstract included).

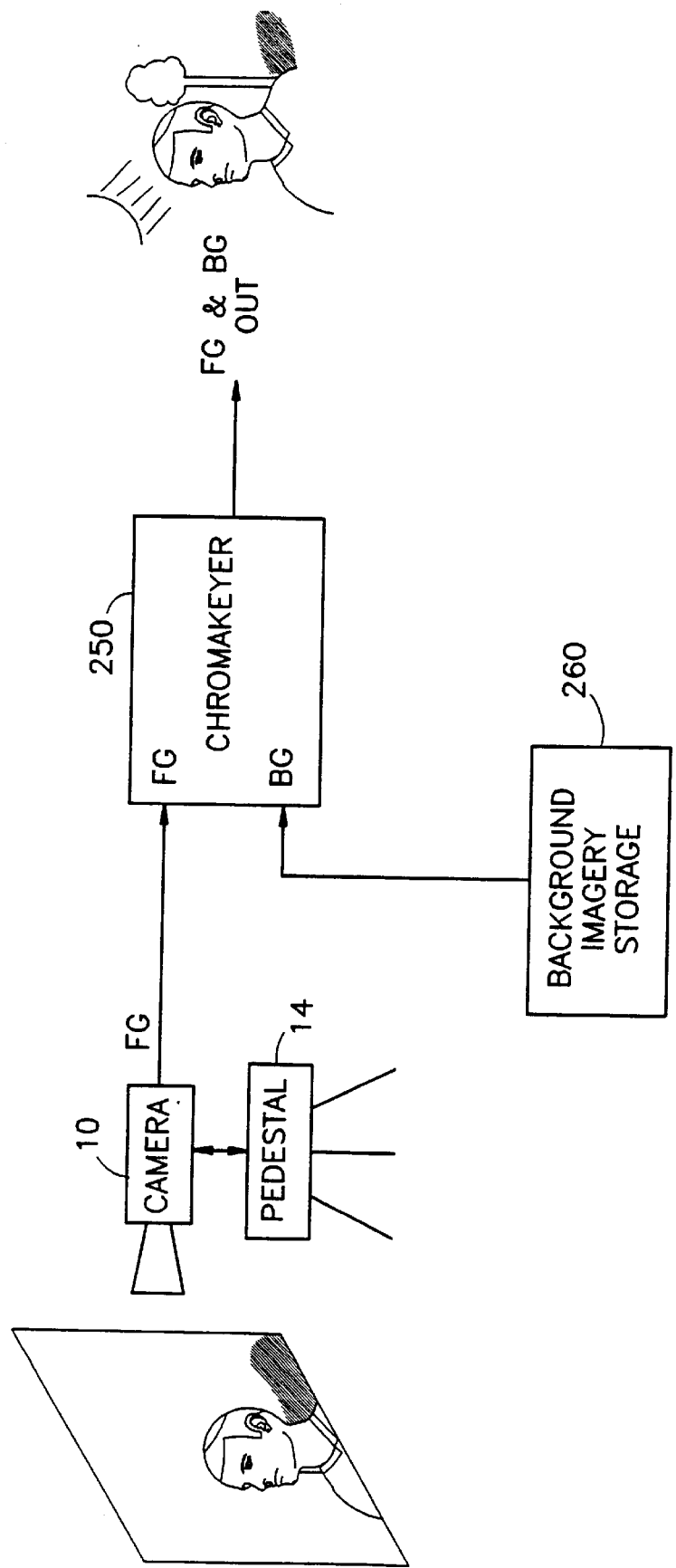
FIG. BA-1

CHROMAKEYING SYSTEM

FIELD OF THE INVENTION

The present invention relates to methods and apparatus for studio imaging including chromakeying.

BACKGROUND OF THE INVENTION

Background chromakey panels are commonly used in the art of television and video production in order to facilitate merging of a virtual background with foreground figures. The foreground figures are imaged on the chromakey panel background, and the known color of the chromakey panel background is detected and replaced by the virtual background. One problem associated with such productions is that changes in the foreground image, due to camera displacement, pan, tilt and zoom in and out, are not automatically applied to the background scene.

One system designed to solve this problem is the "Virtual Studio" developed by Ultimatte. The "Virtual Studio" requires a special memory head pedestal which measures the camera's pan and tilt angles directly from the camera's mount. A disadvantage of this approach is that in order to obtain a complete perspective transformation for the background image, the zoom state of the lens must be read and the instantaneous location of the camera must be determined. Also, this approach requires that each and every camera mount be replaced by a memory head pedestal, resulting in an expensive system and complicated operation if a large number of cameras are employed. Also, the accuracy of this method is inadequate for seamless foreground/background merging.

Conventional edge detection methods which are based on smoothing and finding directional derivates are described in the following publication, the disclosure of which is hereby incorporated by reference:

Canny, J., "A computational approach to edge detection", IEEE Trans. on PAMI, PAMI-8, No. 6, 1986, 679–697.

Conventional edge detection methods which are based on Hough transforms are surveyed in the following publication, the disclosure of which is hereby incorporated by reference:

J. Illingworth and J. Kitler, "A survey of the Hough transform", CVGIP, 44, 1988, 87–116.

FIG. BA-1 is a simplified block diagram of a state of the art chromakeying system.

SUMMARY OF THE INVENTION

The present invention seeks to provide improved methods and apparatus for chromakeying.

There is thus provided in accordance with a preferred embodiment of the present invention a chromakeying panel for use in conjunction with a chromakeying system having a color keying spectrum, the panel including a plurality of first locations bearing a first color within the color keying spectrum, and a plurality of second locations bearing a second color within the color keying spectrum.

Further in accordance with a preferred embodiment of the present invention the first color and the second color are of the same hue and of different intensities.

There is additionally provided in accordance with a preferred embodiment of the present invention a chromakeying system including a frame grabber operative to grab an image of a foreground image including at least one nonuniform chromakeying panel having a known pattern and a subject, a perspective transformation computation unit operative to compute a perspective transformation by comparing the image of at least one portion of the captured panel with the known pattern, and a background generation unit operative to receive a background image, to apply the perspective transformation thereto and to replace the captured portion of at least one panel with the transformed background, thereby to generate a composite image.

Still further in accordance with a preferred embodiment of the present invention the system also includes a 3D background image source operative to provide the background generation unit with a 3D representation of a background scene.

Additionally in accordance with a preferred embodiment of the present invention the system also includes a background image sequence source operative to provide the background generation unit with a temporal sequence of background scenes and wherein the perspective transformation computation unit is operative in real time relative to the pace of the temporal sequence.

Also in accordance with a preferred embodiment of the present invention the background image sequence source includes a video clip source and wherein the perspective transformation computation unit is operative in video real time.

Further in accordance with a preferred embodiment of the present invention the system also includes a graphically animated background image source operative to provide the background generation unit with a graphically animated background scene.

Still further in accordance with a preferred embodiment of the present invention the system also includes a photographed background image source operative to provide the background generation unit with a photographed background scene.

Additionally in accordance with a preferred embodiment of the present invention the system includes a user interface communicating with the background generation unit and operative to determine, for individual virtual object locations within the background image, whether the virtual object location is in front of the subject or in back of the subject and wherein the background generation unit is operative to superimpose the subject over back virtual object locations and to superimpose front virtual object locations over the subject.

Further in accordance with a preferred embodiment of the present invention each individual virtual object location includes a single pixel within the background image.

Still further in accordance with a preferred embodiment of the present invention the system includes a rangefinder boresighted to the camera imaging at least one chromakey panel and the subject and operative to measure the range of a plurality of locations within the camera's field of view and wherein the background generation unit is operative to merge overlaying background image locations and subject locations such that the overlaying location having a smaller range is included in the composite image.

Further in accordance with a preferred embodiment of the present invention the system also includes a plurality of cameras imaging at least one chromakey panel and the subject.

Still further in accordance with a preferred embodiment of the present invention the at least one chromakey panel includes a plurality of chromakey panels.

Additionally in accordance with a preferred embodiment of the present invention the background generator is operative to replace chromakey panel pixels with a transformed background also in the case that the camera's momentary field of view is larger than the chromakey panel's field of view.

There is further provided in accordance with a preferred embodiment of the present invention a chromakeying method for use in conjunction with a chromakeying system having a color keying spectrum, the method including providing a chromakeying panel including a plurality of first locations bearing a first color within the color keying spectrum and a plurality of second locations bearing a second color within the color keying spectrum, and imaging a foreground image including the panel and a subject.

There is additionally provided in accordance with a preferred embodiment of the present invention a chromakeying method including grabbing an image of a foreground image including at least one nonuniform chromakeying panel having a known pattern and a subject, computing a perspective transformation by comparing the image of at least one panel with the known pattern, and receiving a background image, applying the perspective transformation thereto and replacing at least one panel with the transformed background, thereby to generate a composite image.

BRIEF DESCRIPTION OF THE DRAWINGS

The present invention will be understood and appreciated from the following detailed description, taken in conjunction with the drawings in which.

FIG. BA-1 is a simplified block diagram of a prior art chromakeying system.

DETAILED DESCRIPTION OF PREFERRED EMBODIMENTS

FIG. BA-1 illustrates a prior art chromakeying system comprising a chromakeyer 250 and background image storage system 260. The prior art system 260 includes a background data bank for generating a "virtual" background scene.

Figure 1:
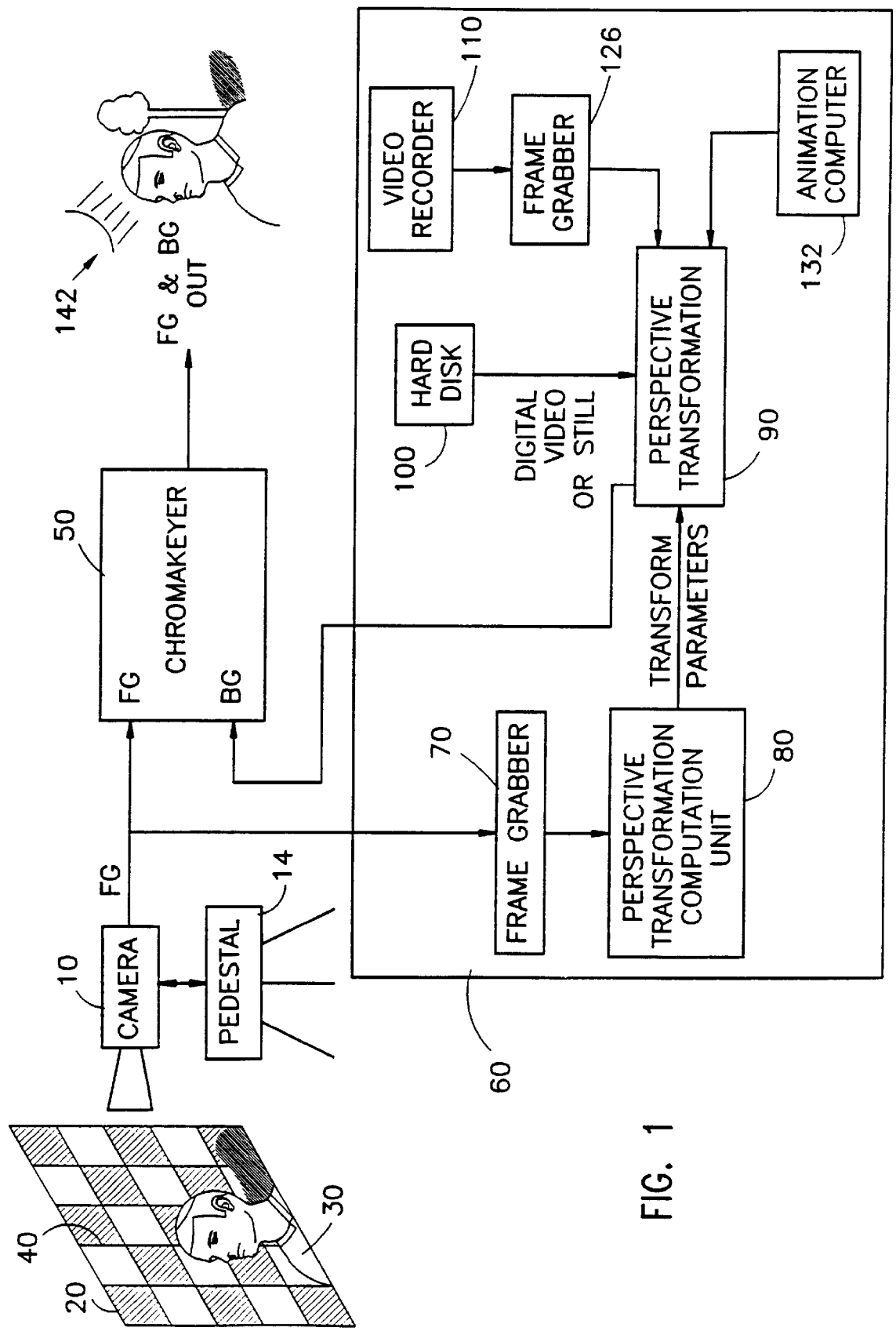
FIG. 1 is a simplified block diagram of a chromakeying system constructed and operative in accordance with a preferred embodiment of the present invention.

Reference is now made to FIG. 1 which illustrates an improved chromakeying system which is constructed and operative in accordance with a preferred embodiment of the present invention. The apparatus of FIG. 1 includes a conventional camera 10 mounted on a conventional pedestal 14. The camera 10 images a chromakey panel 20 which is a backdrop for a subject or foreground object 30 such as a human figure. The chromakey panel typically comprises a colored pattern 40 having the following characteristics:

a. the pattern includes two or more shades both or all fall within the chromakeying spectrum of the apparatus, b. The pattern allows the imaged pattern to be warped to the known actual pattern, and c. The pattern allows perspective distortions of the actual pattern during imaging, due to zoom, linear displacement and angular displacement of the camera 10, to be detected and applied to a virtual background.

A sample pattern having the above characteristics is described in more detail below with reference to FIG. 5. The apparatus of FIG. 1 also includes a chromakeyer 50 and a background generator 60. The chromakeyer 50 is operative to identify the areas within the camera's output image which correspond to the chromakey panel and to replace these areas with a virtual background supplied by background generator 60.

A particular feature of the present invention is that the background supplied by background generator 60 is in perspective with respect to the current camera's orientation and preferably has integrated therewithin other features of the foreground image such as blur, shading and lighting non-uniformity.

The background generator 60 includes a conventional frame grabber 70 which grabs the foreground image from the camera 10 and feeds it to a perspective transformation computation unit 80. The perspective transformation computation unit 80 is operative to analyze the perspective transformation of the chromakey panel pattern in the grabbed foreground image, by comparison with the known chromakey panel pattern. Preferably, other imaging features which affect the panel pattern are also analyzed, such as blur, shading and lighting non-uniformity.

Perspective transformation computation unit 80 feeds the transformation parameters to a perspective transformation unit 90 which applies the perspective transformation to the desired virtual background image. The virtual background may be supplied from any suitable source such as a hard disk 100, an analog video recorder 110 (disk, cassette or tape) associated with a frame grabber 126 or from an animation computer 132.

The output of the system is an image 142 which may be broadcasted or otherwise displayed to an audience which includes a virtual background having the foreground image perspective and other realistic effects such as blur, lighting and shading. It is appreciated that the perspective effect and the blur and lighting effects in image 142 vary over time in exact correspondence with the variation over time of the same effects in the original foreground image.

Figure 2:
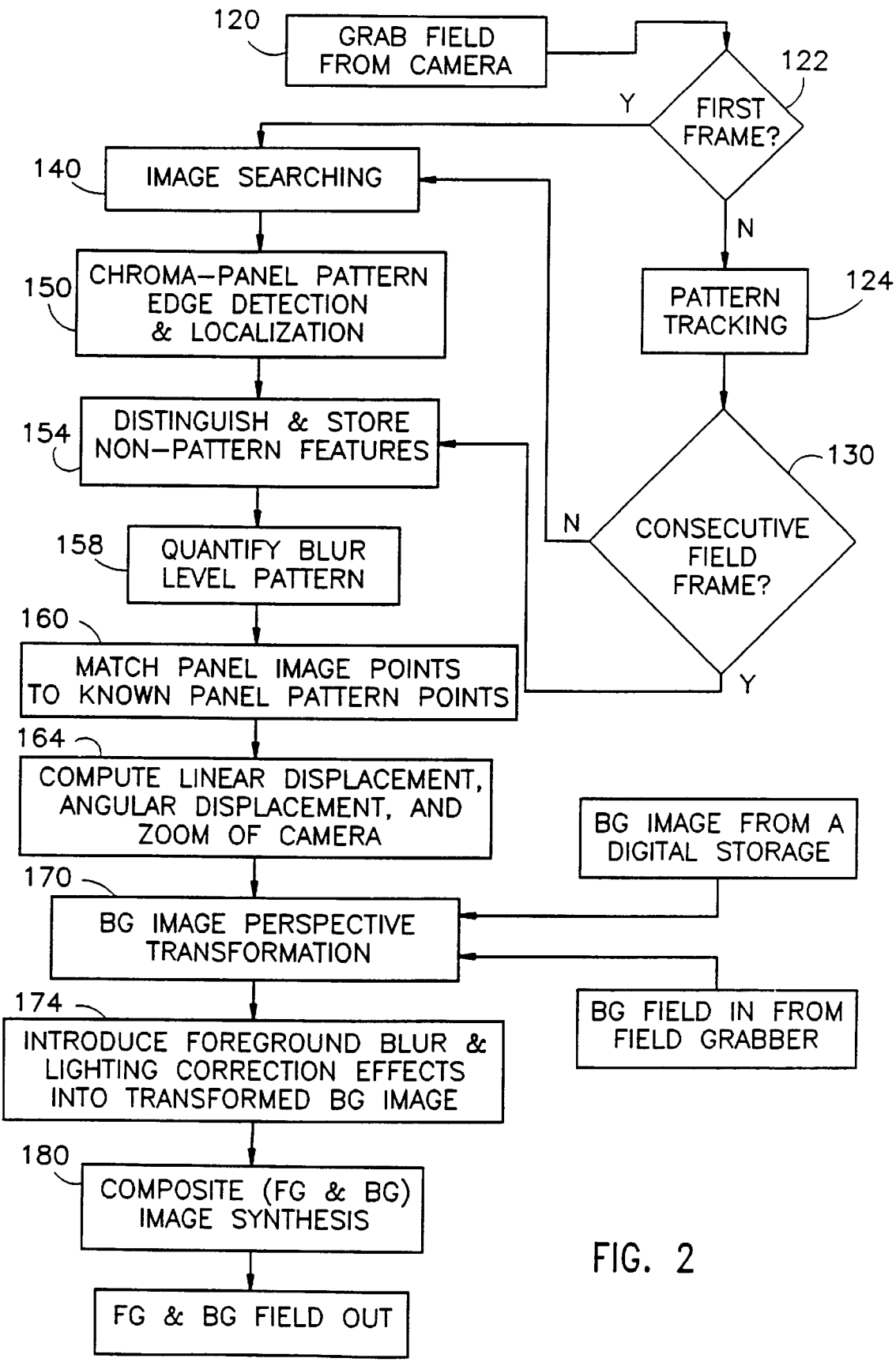
FIG. 2 is a simplified flowchart of a preferred method of operation for the perspective transformation computation unit, perspective transforming unit and chromakeying unit of FIG. 1.

Reference is now made to FIG. 2 which is a simplified flowchart of a preferred method of operation for the perspective transformation computation unit, perspective transforming unit and chromakeying unit of FIG. 1.

The method of FIG. 2 preferably comprises the following steps:

STEP 120: The frame grabber grabs and digitizes the output of the camera, one field at a time or one frame at a time. It is preferable to process field by field due to the camera's angular motion.

STEP 122: If the current grabbed field belongs to the first frame of the session, proceed to step 140. Otherwise proceed to step 124, i.e. if the current grabbed field is a subsequent frame of the session:

STEP 124: Search for the pattern portion analyzed in the previous field, in a window surrounding the corresponding location in the previous field. Alternatively, the search may be conducted inside a window surrounding a new location whose distance from the location in the previous field is determined by predicting the camera's angular speed according to the detected pattern locations in the last consecutive fields.

To detect the pattern edges, conventional edge detection methods may be employed, such as either of the following:

Canny, J., "A computational approach to edge detection", IEEE Trans. on PAMI, PAMI-8, No. 6, 1986, 679–697; or J. Illingworth and J. Kitler, "A survey of the Hough transform", CVGIP, 44, 1988, 87–116.

STEP 130: Decision: Does the current field belong to a "new" frame, i.e. does it directly follow a new cut in which the camera has been switched, or is the current frame a consecutive frame, i.e. an additional frame from the same camera location as the previous frame. The processing after step 130 is on a field by field basis.

If the frame is a new frame, then:

STEP 140: Optionally, find the panel within the camera output image by searching for an area of pixels whose colors fall within the chromakey spectrum. Pattern edge detection may then be performed from this starting point rather than from an arbitrary starting point.

STEP 150: Perform edge detection on the captured panel portion, preferably with single pixel or subpixel accuracy, using conventional edge detection methods such as those described in the above-referenced Canny and Illingworth publications. The pattern lines are then constructed using the detected edges. Edge detection is typically performed along each of the horizontal and vertical dimensions at least until two edges have been found along one of the dimensions and three edges along the other of the dimensions and altogether five lines have been defined. Finding two lines in one dimension and three lines in the other results in six vertices connecting these lines which are subsequently matched to the known panel pattern as described below with reference to step 160.

STEP 154: Within the detected edges, distinguish the pattern from non-pattern features which obscure the pattern, such as shadows, lens distortions, and lighting nonuniformities. For example, the pattern features may be distinguished by their straight-line segments, as in the pattern of FIG. 5, because the non-pattern features usually have curved edges. Also, non-pattern edges such as those due to lighting nonuniformities are often smooth whereas the pattern edges are sharp in the direction perpendicular to camera motion. The locations of the non-pattern edges are stored in order to allow subsequent correction of the virtual background image. The non-pattern edges are ignored in the subsequent analysis.

Also stored is an indication of the color intensity map inside the shadow edges or within lighting nonuniformity contours or inside any contour isolating regions of lens abberation, such as vignetting.

STEP 158: Optionally, quantify the blur introduced into the pattern by the camera's scanning during the imaging field time. The blur level at a plurality of locations within the image is stored so that the same blur level can be virtually applied to the virtual background. Typically, the blur level is stored as a "map" which indicates the blur level associated with a grid of pixels located on the detected lines. The blur levels at other image points may be interpolated from this map.

STEP 160: For at least four locations (typically vertices) in the imaged panel portion, find the same number of matching locations (vertices) in the original panel pattern. For example, locations may be matched on the basis of unique ratios between line segments, as described below in detail with reference to FIG. 5. For localization, two line segments are normally required in one direction, so three detected lines are normally needed in the perpendicular dimension.

At least four imaged panel locations $(x_i, Y_i)$ are typically matched to a corresponding number of original panel pattern locations $(X_i, Y_i)$.

STEP 164: Use the paired locations to compute the linear displacement, angular displacement and zoom change of the imaging camera with respect to the previous orientation or with respect to the original camera orientation.

The computations may be based on the following equations 1–7 for perspective transformation, where:

$X_O$, $Y_O$, $Z_O$=the linear displacement of the imaging camera;

The angular displacement parameters are $\alpha$ (pan), $\beta$ (tilt), and gamma (roll), respectively;

f=the zoom of the imaging camera;

$R_x(\alpha)$=Rotation about the X-axis;

$R_y(\beta)$=Rotation about the Y-axis; and $R_z(\ )$=Rotation about the Z-axis.

$$R_x(\alpha) = \begin{pmatrix} 1 & 0 & 0 \\ 0 & \cos\alpha & -\sin\alpha \\ 0 & \sin\alpha & \cos\alpha \end{pmatrix} \quad \text{Eq. 1}$$

$$R_z(\gamma) = \begin{pmatrix} \cos\gamma & -\sin\gamma & 0 \\ \sin\gamma & \cos\gamma & 0 \\ 0 & 0 & 1 \end{pmatrix} \quad \text{Eq. 2}$$

$$R_y(\beta) = \begin{pmatrix} \cos\beta & 0 & \sin\beta \\ 0 & 1 & 0 \\ -\sin\beta & 0 & \cos\beta \end{pmatrix} \quad \text{Eq. 3}$$

$$R = R_y(\beta) R_x(\alpha) R_z(\gamma) \quad \text{Eq. 4}$$

$$R = \begin{pmatrix} p_1 & p_2 & p_3 \\ q_1 & q_2 & q_3 \\ r_1 & r_2 & r_3 \end{pmatrix} \quad \text{Eq. 5}$$

$$x_i = f \cdot \frac{p_1(X_i - X_0) + q_1(Y_i - Y_0) - r_1 Z_0}{p_3(X_0 - X_i) + q_3(Y_0 - Y_i) + r_3 Z_0} \quad \text{Eq. 6}$$

$$y_i = f \cdot \frac{p_1(X_i - X_0) + q_2(Y_i - Y_0) - r_2 Z_0}{p_3(X_0 - X_i) + q_3(Y_0 - Y_i) + r_3 Z_0} \quad \text{Eq. 7}$$

STEP 170: Receive the background image from the framegrabber 70 or hard disk 100 or animation computer 132 of FIG. 1 and transform the background image so as to reproduce the linear displacement, angular displacement and focal length change of the imaging camera. Every background pixel i whose center is in $(X_i, Y_i)$ coordinates, is now transformed to location $(x_i, y_i)$ using equations (1–7). Typically, this operation is performed inversely: for each destination pixel i whose center is at $(x_i, y_i)$ the source location $(X_i, Y_i)$ is computed using the inverse of equations 6 and 7. The destination pixel value is then computed by weighting the source neighboring pixels using nearest neighbors, bi-linear approximations or tri-linear approximations.

STEP 174: Optionally, the transformed image is corrected so as to virtually apply the stored blur, shadow and lighting nonuniformities data to the transformed image, thereby to emulate, within the background, the same type of effects which are occurring in the foreground.

STEP 180: The composite image is generated by replacing the chromakey panel pixels in the foreground image with the corresponding pixels of the transformed and corrected background image.

Figure 3:
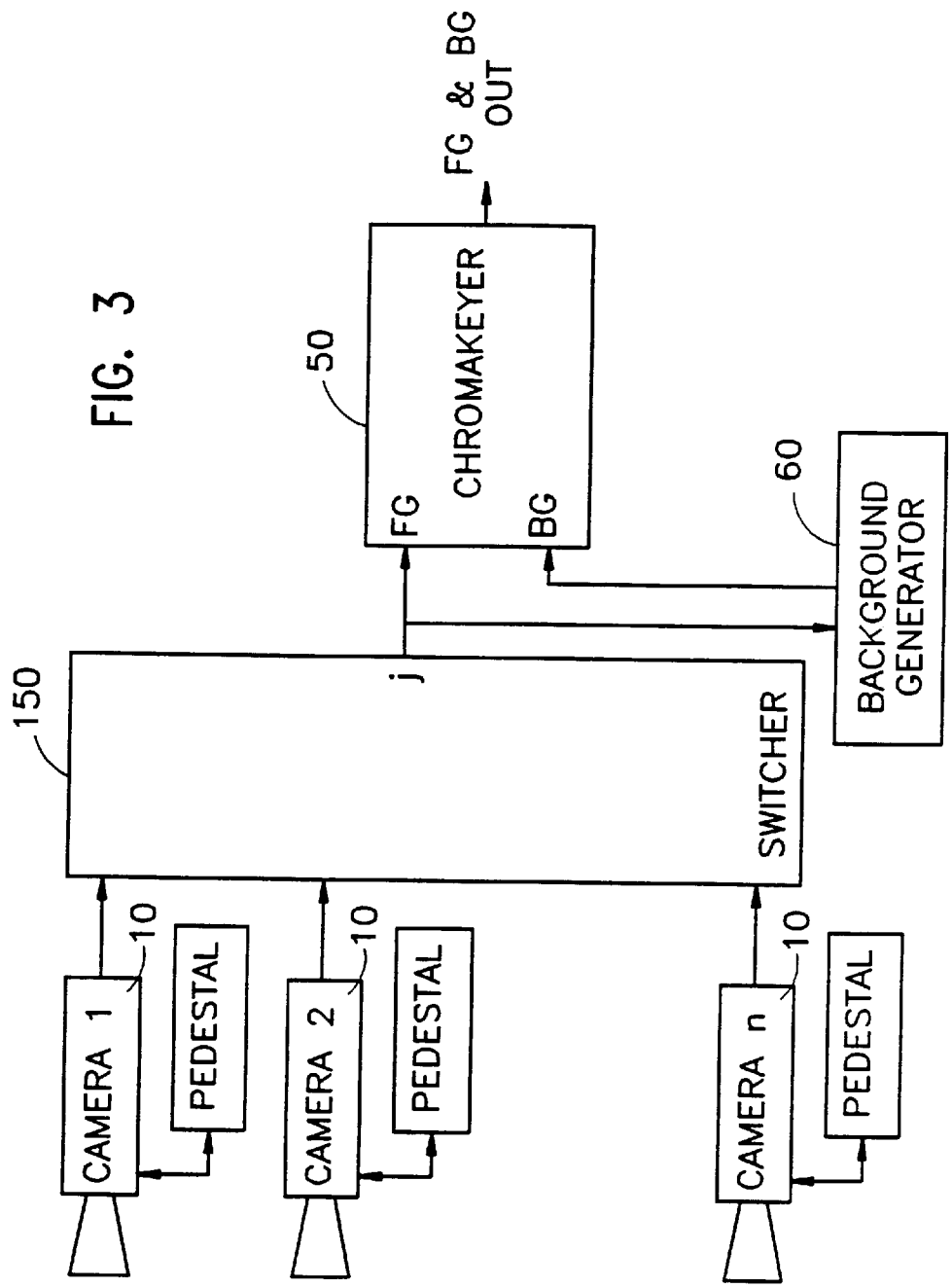
FIG. 3 is a simplified block diagram of an application for the apparatus of FIG. 1, in a multi-camera studio.

FIG. 3 is a simplified block diagram of an application for the apparatus of FIG. 1, in a multi-camera studio which includes an array of n cameras 10 and a switcher 150 which enables a producer to switch from one camera to another. It is appreciated that only one background generator 60 is required for the array of cameras 10.

Figure 4:
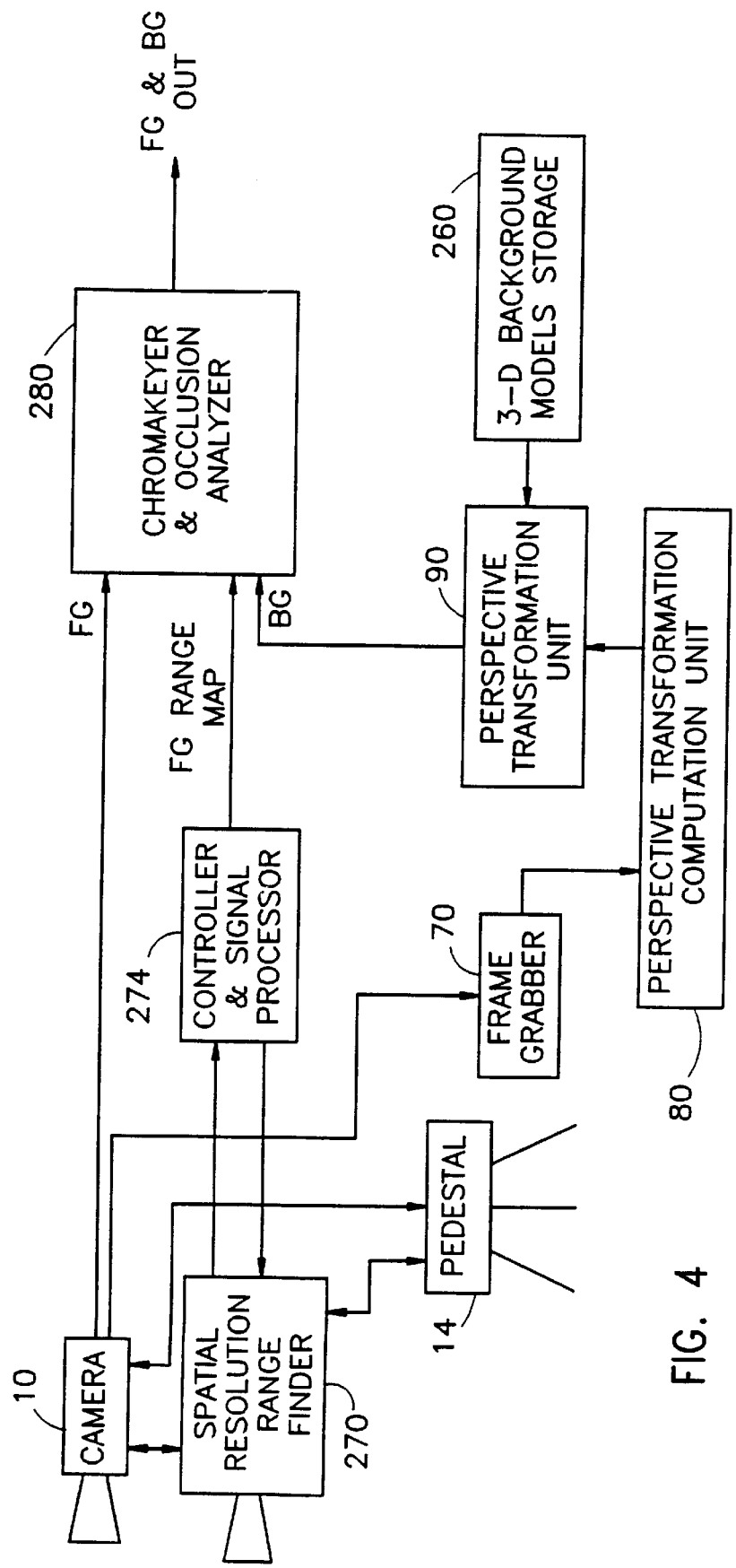
FIG. 4 is a modification of the apparatus of FIG. 1 in which a range-finder with spatial resolution, boresighted to the camera, is used to obtain range data for foreground objects.

FIG. 4 is a modification of the apparatus of FIG. 1 which generates a perspectively transformed 3D background. A storage medium 260, such as a computer hard disk array, is provided which stores a virtual 3background. A rangefinder 270 with spatial resolution, typically a pulsed laser transmitter/detector module, is boresighted to the imaging camera and scans the camera's field of view measuring the range to each visible pixel or a group of pixels using pulse "time of flight". Range-finder 270 is associated with the camera 10 and pedestal 14 and is operative to detect the range to each pixel or group of pixels visible in the captured image. A laser controller and detector's signal processor 274 is associated with rangefinder 270 and is operative to control laser pulse timing and to extract momentary range from the received echoes.

The chromakeyer 50 is replaced by a chromakeyer 280 which is augmented with an occlusion analysis function. Chromakey panel pixels are replaced with the transformed and preferably corrected virtual background. For each background pixel the range measured with the rangefinder is compared to the Z-value of the corresponding background pixel. If the Z value is smaller than the range, the Chromakey displays the background pixel.

Figure 5:
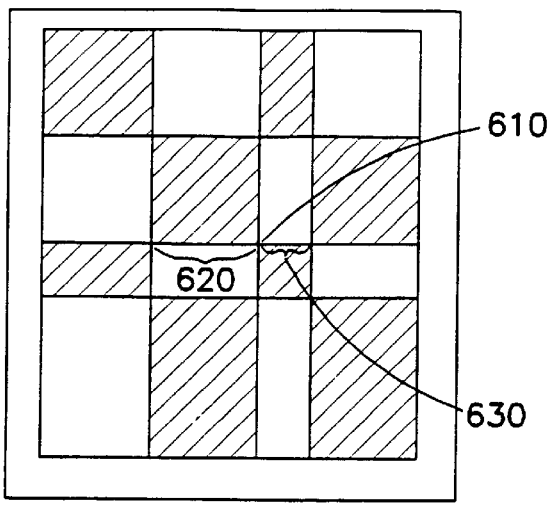
FIG. 5 is a diagram of a portion of a pattern for a chromakey panel constructed and operative in accordance with a preferred embodiment of the present invention.
Figure 6:
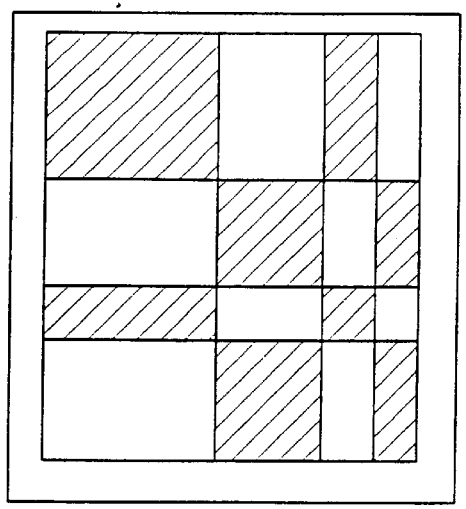
FIG. 6 illustrates the effect of camera displacement on the panel portion of FIG. 5.
Figure 7:
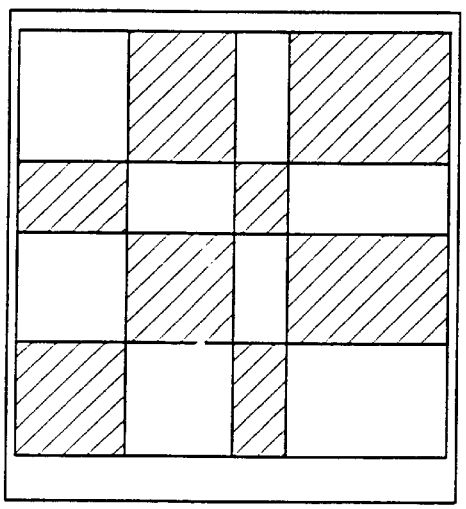
FIG. 7 illustrates the effect of zoom on the panel portion of FIG. 5.
Figure 8:
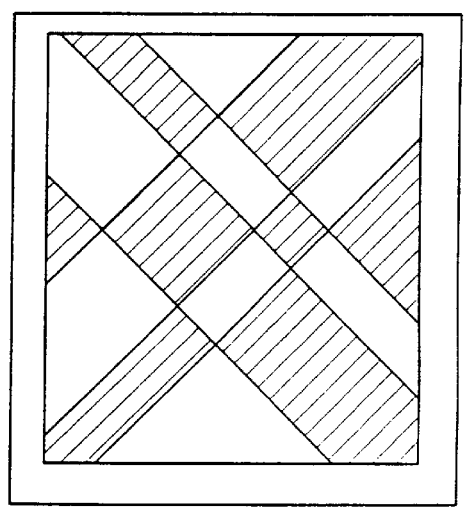
FIG. 8 illustrates the effect of roll on the panel portion of FIG. 5.

Reference is now made to FIG. 5 which is a diagram of a portion of a pattern for a chromakey panel constructed and operative in accordance with a preferred embodiment of the present invention.

The pattern portion of FIG. 5 typically comprises an uneven checkerboard of quadrilaterals having two alternating shades within the chromakey spectrum. The edges of the quadrilaterals are arranged along two dimensions, which may be perpendicular, such as the horizontal and vertical dimensions, but need not necessarily be so. The pattern portion of FIG. 5 preferably has the following attribute for each dimension d:

For every vertex 610, the ratio between the length of the line segment 620 on one side thereof, along the dimension d, and the length of the line segment 630 on the other side thereof, along the dimension d, is unique. In other words, there is no other vertex whose adjacent line segments along the dimension d or along both directions have the same ratio between their lengths. This attribute allows vertices, when detected, to be localized by computing the above ratio and comparing it to the known ratios associated with the various vertices.

For example, in the illustrated embodiment, the ratio between the lengths of segments 620 and 630 is 2 and none of the vertices of FIG. 5, other than vertex 610, have the same ratio.

Preferably, the pattern also has the following pair of attributes:

a. At least two pattern vertices in one direction and three in the other direction are included in the minimal field of view (maximum magnification) of the camera, b. In the maximal field of view (minimal magnification) of the camera, the imaging camera resolution is sufficient to allow adjacent edges to be separated by conventional edge detection methods.

A suitable panel may be approximately 3 m×3 m in size and may have an uneven checkerboard pattern, such that the sequence of ratios between adjacent line segments along one or each dimension is a permutation of the following numbers: 1.01, 1.03, 1.05, 1.07, 1.09, 1.11, 1.13, 1.15, 1.17, 1.19, . . . The largest line segment may be determined by computation such that at least six pattern vertices are included in the minimal field of view (maximum magnification) of the camera. The permutation of the above sequence of numbers is preferably such that small ratios are adjacent to large ratios. For example, the first 6 numbers may be: 1.01, 1.19, 1.03, 1.17, 1.05, 1.15, and so on.

The field of view of the camera can, if desired, exceed the size of the chromakey panel.

Reference is also made to FIGS. 6–10 which illustrate the effects of camera displacement; zoom; roll; a combination of tilt and displacement; and a combination of pan and displacement, respectively, on the panel portion of FIG. 5. In the present specification and claims, roll, tilt and pan are the angular displacements about the Z axis, X axis and Y axis, respectively, where the panel plane is the X-Y plane.

Figure 9:
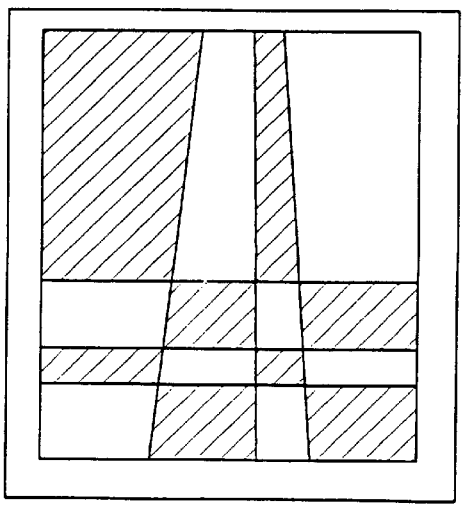
FIG. 9 illustrates the effect of a combination of camera tilt and displacement on the panel portion of FIG. 5.
Figure 10:
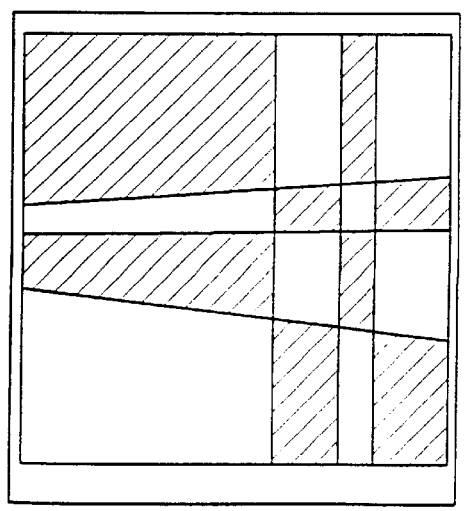
FIG. 10 illustrates the effect of a combination of camera pan and displacement on the panel portion of FIG. 5.

In FIG. 9, the camera is first tilted and then displaced in parallel to the panel plane to capture the same panel portions. In FIG. 10, the camera is first panned and then displaced in parallel to the panel plane to capture the same panel portions.

The abbreviations "FG" and "BG" are used for "foreground" and "background", respectively. The term "foreground" refers to the subject (such as the protagonists of a talk show) and the chromakey panel which is the backdrop. The term "background" refers to the image which replaces the chromakey panel, such as an image of an outdoor scene.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

We claim:

1. A chromakeying system comprising:

a store operative to store a representation of a known coded chromakeying pattern;

a frame grabber operative to grab a video image including at least a portion of the coded chromakeying pattern and a foreground subject;

a perspective transformation computation unit operative to compute a perspective transformation by comparing the video image of the portion of the coded chromakeying pattern with the known coded chromakeying pattern; and a background generation unit operative to receive a background image, apply the perspective transformation thereto to produce a transformed background and replace the portion of the coded chromakeying pattern in the video image with the transformed background and, thereby generate a composite image.

2. The chromakeying system of claim 1, further comprising a 3D background image source operative to provide the background generation unit with the background image, the background image being a 3D representation of a background scene.

3. The chromakeying system of claim 1 further comprising a background image sequence source operative to provide the background generation unit with a temporal sequence of background images and wherein the perspective transformation computation unit is operative in real time relative to a pace at which the background image sequence source provides the temporal sequence to the background generation unit.

4. The chromakeying system as in claim 1, further comprising a user interface for communicating with the background generation unit and operative to determine, for individual virtual object locations within the background image, whether each virtual object location is in front of the foreground subject or in back of the foreground subject and wherein the background generation unit is operative to superimpose the foreground subject over a portion of each virtual object location that is in back of the foreground subject and to superimpose a portion of the transformed background over each virtual object location that is in front of the foreground subject.

5. The chromakeying system according to claim 4 wherein each individual virtual object location comprises a single pixel within the background image.

6. The chromakeying system of claim 1, further comprising a rangefinder boresighted to a camera for producing the video image of at least a portion of the chromakeying pattern and the foreground subject and operative to measure a range of a plurality of locations within a field of view of the camera and wherein the background generation unit is operative to merge the transformed background such that the composite image is generated by displaying the transformed background on locations that have a range that is smaller than a given range.

7. The chromakeying system of claim 3, wherein the coded chromakeying pattern comprises a plurality of straight lines that intersect to define vertices, and wherein the plurality of straight lines are spaced from each other so that for a given vertex a ratio of the distance of one of the lines extending from the given vertex to a first adjacent vertex to the distance of another of the lines extending from the given vertex to a second adjacent vertex is unique.

8. A method of compositing a virtual scene with a video image created by a video camera in which the virtual scene automatically changes perspective in relation to movement of the video camera creating the video image, comprising the steps of:

capturing a video image of a background chromakey panel, said panel having a defined pattern comprising a plurality of straight lines that intersect to define vertices, and wherein the plurality of straight lines are spaced from each other so that for a given vertex a ratio of the distance of one of the lines extending from the given vertex to a first adjacent vertex to the distance of another of the lines extending from the given vertex to a second adjacent vertex is unique;

processing the video image to obtain perspective information that identifies a perspective of the camera relative to the panel independently in each video field of the camera; and transforming a video image of the virtual scene based on the perspective information that identifies the perspective of the camera.

* * * * *